United States Patent [19]

Kenny et al.

[11] Patent Number: 6,031,021

[45] Date of Patent: *Feb. 29, 2000

[54] THERMAL TRANSFER RIBBON WITH THERMAL DYE COLOR PALETTE

[75] Inventors: Frank J. Kenny, Centerville; Richard D. Puckett, Miamisburg; Thomas C. Miller, Jr., Kettering, all of Ohio

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,097

[22] Filed: Apr. 11, 1997

[51] Int. Cl.[7] .................................................. C09D 5/00
[52] U.S. Cl. ............................................... 523/161
[58] Field of Search ............................................. 523/161

[56] References Cited

U.S. PATENT DOCUMENTS

| | | | |
|---|---|---|---|
| 3,615,565 | 10/1971 | Gerlach | 430/8 |
| 3,615,566 | 10/1971 | Robinson | 430/8 |
| 3,663,278 | 5/1972 | Blose et al. . | |
| 4,067,840 | 1/1978 | Wolf | 252/365 |
| 4,097,288 | 6/1978 | Lawton | 428/913 |
| 4,180,405 | 12/1979 | Lawton | 427/148 |
| 4,315,643 | 2/1982 | Tokunaga et al. . | |
| 4,370,370 | 1/1983 | Iwata et al. . | |
| 4,403,224 | 9/1983 | Wirnowski . | |
| 4,463,034 | 7/1984 | Tokunaga et al. . | |
| 4,466,941 | 8/1984 | Cerami | 422/57 |
| 4,500,626 | 2/1985 | Naito | 430/203 |
| 4,628,000 | 12/1986 | Talvalkar et al. . | |
| 4,687,701 | 8/1987 | Knirsch et al. . | |
| 4,707,395 | 11/1987 | Ueyama et al. . | |
| 4,740,495 | 4/1988 | Marinelli et al. . | |
| 4,777,079 | 10/1988 | Nagamoto et al. . | |
| 4,778,729 | 10/1988 | Mizobuchi . | |
| 4,923,749 | 5/1990 | Talvalkar . | |
| 4,975,332 | 12/1990 | Shini et al. . | |
| 4,983,446 | 1/1991 | Taniguchi et al. . | |
| 4,988,563 | 1/1991 | Wehr . | |
| 5,128,308 | 7/1992 | Talvalkar . | |
| 5,240,781 | 8/1993 | Obata et al. . | |
| 5,248,652 | 9/1993 | Talvalkar . | |
| 5,266,447 | 11/1993 | Takahashi et al. . | |
| 5,322,831 | 6/1994 | Minami et al. . | |
| 5,348,348 | 9/1994 | Hanada et al. . | |
| 5,470,816 | 11/1995 | Satake et al. . | |
| 5,595,590 | 1/1997 | Belding | 427/7 |

*Primary Examiner*—Edward J. Cain
*Attorney, Agent, or Firm*—Millen White Zelano & Branigan, PC

[57] ABSTRACT

There is provided by the present invention a coating formulation and thermal transfer medium and printer which provide printed images in a range of colors by employing thermal dye systems in the thermal transfer layers that form the images. The thermal dye systems contain at least two reactive dyes which react at different temperatures, an activator for the reactive dyes and optionally, a sensitizer for the reactive dyes. The use of multiple reactive dyes enables a range of colors to be produced from one thermal transfer ribbon using either a multihead thermal printer or a single head thermal printer operating at different print head energies.

8 Claims, No Drawings

THERMAL TRANSFER RIBBON WITH THERMAL DYE COLOR PALETTE

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

BACKGROUND OF THE INVENTION

Thermal transfer printing has displaced impact printing in many applications due to advantages such as the relatively low noise levels which are attained during the printing operation and high reliability. Thermal transfer printing is widely used in special applications such as in the printing of machine-readable bar codes and magnetic alpha-numeric characters. The thermal transfer process provides great flexibility in generating images and allows for broad variations in style, size and color of the printed image. Thermal transfer printing requires a special medium for transferring ink or other sensible material to a receiving substrate. This special medium, referred to herein as a "thermal transfer medium," typically comprises a functional layer on a substrate. The functional layer, also referred to as a "thermal transfer layer," contains the ink or sensible material that is transferred upon application of heat from a thermal print head. The thermal transfer layer comprises a mixture of components which vary significantly in identity and concentration, depending on the end use. Representative documentation in the area of thermal transfer printing includes the following patents.

U.S. Pat. No. 3,663,278, issued to J. H. Blose et al. on May 16, 1972, discloses a thermal transfer medium comprising a base with a coating comprising of cellulosic polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obatta et al., discloses an ink ribbon for thermal transfer printers having a thermal transfer layer comprising a wax-like substance as a main component and a thermoplastic adhesive layer having a film forming property.

There are many requirements placed on the thermal transfer layers and the coating formulations which produce them to be suitable for thermal transfer printing. For example, the properties of the thermal transfer layer and coating formulation must permit rapid transfer from a carrier to a receiving substrate and provide a stable, preferably permanent image of high resolution. There are some limitations on the applications for conventional thermal transfer printing due to these many requirements. For example, where multiple colors are desired, separate coating formulations and separate ribbons are used for each color. The different colors are applied separately either with a multi-head thermal printer or sequentially with a single head printer. It is desirable to perform multicolor printing without the need for complex equipment or multiple processing and to reduce the materials needed, i.e., coating formulations and thermal transfer media in forming multicolor images to simplify the printing operation and reduce costs.

SUMMARY OF THE INVENTION

It is an object of the present invention to provide a single supply thermal transfer medium for a multihead printer which can form printed images in a range of colors.

It is an object of the present invention to provide a single thermal transfer medium which can form printed images in a range of colors with a multihead printer at varied print head settings.

It is an additional object of the present invention to provide a single thermal transfer medium which can form printed images in cyan, magenta, yellow and black.

It is another object of the present invention to provide a coating formulation which will form thermal transfer layers of a thermal transfer medium wherein the thermal transfer layers will produce images in a range of colors under varied print head settings.

It is yet another object of the present invention to provide a coating formulation which will form thermal transfer layers of a thermal transfer medium wherein the thermal transfer layers will produce images in cyan, magenta, yellow and black.

It is further object of the present invention to provide a coating formulation and thermal transfer media obtained therefrom which contain multiple reactive dyes which react at different temperatures to generate different colors, preferably, cyan, magenta, yellow and black.

It is a further object of the present invention to provide a thermal printer in combination with a thermal transfer medium which contains multiple reactive dyes within the thermal transfer layer which react at different temperatures to generate different colors.

These and other objects and advantages of the present invention will become apparent and further understood from the detailed description and claims which follow.

The above objects are achieved through the use of a coating formulation, thermal transfer medium and thermal printer provided by the present invention.

There is provided by this invention a coating formulation which forms thermal transfer layers for thermal transfer media which transfer images to a receiving substrate upon exposure to the print head of a thermal printer, said formulation comprising a sensible material, a binder component for said sensible material, water or organic solvent and a thermal dye system comprising two or more reactive azo or leuco dyes which are reactive at distinct temperatures, an activator for the azo or leuco dyes, and optionally a sensitizer for one or more of said thermally reactive azo or leuco dyes.

In another aspect of the present invention, there is provided a thermal transfer medium which transfers images to a receiving substrate when exposed to the print head of a thermal printer, said thermal transfer medium comprising a flexible substrate with a thermal transfer layer positioned thereon, said thermal transfer layer comprising a sensible material, a binder for said sensible material and a thermal dye system comprising two or more reactive azo or leuco dyes which are reactive at distinct temperatures, an activator for the azo or leuco dyes, and optionally a sensitizer for one or more of said thermally reactive azo or leuco dyes.

A further aspect of the present invention is a combination of a thermal printer and a thermal transfer medium wherein the thermal transfer medium contains a thermal transfer layer comprising a sensible material, a binder for said sensible material and a thermal dye system comprising two or more reactive azo or leuco dyes which are reactive at distinct temperatures, an activator for the azo or leuco dyes, and optionally a sensitizer for one or more of said thermally reactive azo or leuco dyes.

DETAILED DESCRIPTION OF THE PREFERRED EMBODIMENTS

A coating formulation of this invention comprises the components of conventional coating formulations such as one or more of a sensible material, a binder component for said sensible material and optionally an organic solvent or water. The coating formulation of the present invention additionally comprises a thermal dye system. This thermal dye system, as defined herein, comprises multiple (two or more) reactive dyes which are reactive at distinct temperatures, at least one activator and optionally a sensitizer.

The reactive dyes used in the present invention, also referred to in the art as dye precursors, can be those known in the art of thermal recording sheets but they are not specifically limited to those employed in the art of thermal recording sheets. The reason why the reactive dyes of recording sheets are desirable is that they provide color change at the operating temperatures of most thermal print heads. In general, a thermal recording sheet uses a basic colorless dye as an electron donor, and an organic acid substance such as a phenolic compound, an aromatic carboxylic acid, an organic sulfonic acid, or the like as an electron acceptor. The thermally initiated (heat and melting) reaction of the reactive dye (base) and the activator/color developer (acid) is an acid-base reaction based on electron donation and acceptance, which forms a metastable "charge transfer complex", thereby obtaining a color image.

Preferred reactive dyes are the thermally reactive azo dyes and leuco dyes. These include triphenylmethane type leuco dyes, fluorane type leuco dyes and fluorene type leuco dyes. Examples of leuco dyes that can be employed in the present invention are as follows:

(1) Leuco bases of triphenylmethane dyes, such as
3,3-bis(p-dimethylaminophenyl)-phthalide,
3,3-bis(p-dimethylaminophenyl)-6-dimethylaminophthalide (or Crystal Violet Lacton),
3,3-bis(p-dimethylaminophenyl)-6-diethylaminophthalide,
3,3-bis(p-dimethylaminophenyl)-6-chlorophthalide,
3,3-bis(p-dibutylaminophenyl)-phthalide.
(2) Leuco base of fluoran dyes, such as
3-cyclohexylamino-6-chlorofluoran,
3-(N,N-diethylamino)-5-methyl-7-(N,N-dibenzylamino) fluoran,
3-dimethylamino-5,7-dimethylfluoran,
3-diethylamino-7-methylfluoran,
3-diethylamino-5-methyl-7-t-butylfluoran.
(3) Fluoran dyes, such as
3-diethylamino-7-chlorofluoran,
3-diethylamino-6-methyl-7-chlorofluoran,
3-pyrrolidino-6-methyl-7-chlorofluoran,
3-dimethylamino-6-methyl-7-anilinofluoran,
2-(N-(3'-trifluoromethylphenyl)amino)-6-diethylamino-fluoran,
3-diethylamino-7-cyclohexylaminofluoran,
2-(3,6-bis(diethylamino)-9-(o-chloroanilino)xyanthyl-benzoic acid lactam),
3-dimethylamino-6-methyl-7-p-butylanilinofluoran,
3-diethylamino-6-methyl-7-anilinofluoran,
3-(N-ethyl-p-toluidino)-6-methyl-7-anilinofluoran,
3-(N-ethyl-N-isoamylamino)-6-methyl-7-anilinofluoran,
3-diethylamino-6-methyl-7-(o,p-dimethylanilino)fluoran,
3-pyrrolidino-6-methyl-7-anilinofluoran,
3-piperidino-6-methyl-7-anilinofluoran,
3-(N-cyclohexyl-N-methylamino)-6-methyl-7-anilinofluoran,
3-diethylamino-7-(m-trifluoromethylanilino)fluoran,
3-dibutylamino-6-methyl-7-anilinofluoran,
3-diethylamino-6-methyl-7-anilinofluoran,
3-dibutylamino-7-(o-chloroanilino)fluoran,
3-diethylamino-7-(o-chloroanilino)fluoran.
(4) Lacton compounds, such as
3-(2'-hydroxy-4-dimethylaminophenyl)-3-(2'-methoxy-5'-chlorophenyl)phthalide,
3-(2'-hydroxy-4-dimethylaminophenyl)-3-(2'-methoxy-5'-nitrophenyl)phthalide, 3-(2'-hydroxy-4-diethylaminophenyl)-3-(2'-methoxy-5'-methylphenyl)phthalide, 3-(2'-hydroxy-4-dimethylaminophenyl)-3-(2'-hydroxy-4'-chloro-5'-methylphenyl)phthalide.

Additional examples of Leuco dyes appear on columns 52 and 53 of U.S. Pat. No. 5,470,816. Suitable commercial dyes are the Copikem® series, available from Hilton Davis of Cincinnati, Ohio.

Suitable azo dyes vary widely in scope due to the vast number available. Those commercially available azo dyes (mono or diazo) which are basic often can be used with the leuco dyes with the same activator. Those which have the following diazo components are suitable:

Azoic diazo component 3 (2,5-dichloroaniline, produced by the reaction of 1,4-dichloro-2-nitrobenzene);

Azoic diazo component 5 (4-nitro-o-anisidine, produced by nitration of O-acetanisidide with subsequent hydrolysis);

Azoic diazo component 8 (2-nitro-p-toluidine produced by nitration of o-acetotoluidide in $H_2SO_4$ and subsequent saponification);

Azoic diazo component 13 (5-nitro-o-anisidine, produced either by partial reduction of 2,4-dinitroanisole or nitration of o-anisidine);

Azoic diazo component 20 (4'-amino-2',5'-diethoxybenzanilide, produced by condensation of 2,5-diethoxyaniline with benzoyl chloride, followed by nitration and reduction);

Azoic diazo component 32 (5-chloro-o-toluidine, produced by nitration of p-chlorotoluene followed by reduction of the resulting 4-chloro2-nitrotoluene); and Azoic diazo component 34 (4-nitro-o-toluidine, produced by nitration of o-benzenesulfonotoluidide followed by hydrolysis).

Combinations of two or more reactive dyes are used in the thermal dye systems within the coating formulations and thermal transfer media of this invention. These dyes are preferably reactive at different temperatures and preferably also generate a distinct color once reacted.

The thermal dye systems of the present invention include an activator (color developer) for the dyes. The same activator can be used for each dye, provided they do not promote reaction of two dyes at similar temperatures. Examples of acidic materials that can be employed as activators in the present invention are as follows:

boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, 3,5-xylenol, thymol, p-tert-butylphenyl, 4-hydroxyphenoxide, methyl-4-hydroxybenzoate, 4-hydroxyacetophenone, α-naphthol, β-naphthol, catechol, resorcin, hydroquinone, 4-tert-octylcatechol, 4,4'-butylidenephenol, 2,2'-dihydroxydiphenyl, 2,2'-methylenebis(4-methyl-6-tert-butyl-phenol), 2,2'-bis(4'-hydroxyphenyl)propane or bisphenol A), 4,4'-isopropylidenebis(2-tert-butylphenol), 4,4'-secbutylidenediphenol, pyrogallol, phloroglucine, phlorogluocinocarboxylic acid, 4-phenylphenol, 2,2'-methylenebis(4-chlorophenyl), 4,4'-isopropylidenediphenol, 4,4'-isopropylidenebis(2-chlorophenol), 4,4'-isopropylidenebis(2-methylphenol), 4,4'-ethylenebis(2-methylphenol) and 4,4'-thiobis(6-t-butyl-3-methylphenol). Certain examples can be classified into groups which include, bisphenol A and its derivatives, 4-hydroxybenzoic esters, 4-hydroxyphthalic diesters, phthalic monomers, bis(hydroxyphenyl)sulfides, 4-hydroxyarylsulfones, 4-hydroxyphenylarylsulfonates, 1,3-di[2-(hydroxyphenyl)-2-propyl]benzenes, resorcinols, hydroxybenzoyloxybenzoic ester, bisphenolsulfones, 2,4-dihydroxybenzophenones, novolac type phenolic resins, 4-hydroxyacetophenone and p-phenylphenol. Practical examples thereof are also shown in columns 7, 8 and 9 of U.S. Pat. No. 5,322,831, issued to Minami et al.

In the thermal dye systems of the present invention, it is an option to employ known sensitizers for the dyes to adjust the temperature at which they react. Such adjustment will depend on the dye and the equipment used. Suitable stabilizers include: stearamide, palmitamide, or the like; ethylene-bisamide, montan wax, polyethylene wax, dibenzyl terephthalate, benzyl p-benzyloxybenzoate, di-p-tolylcarbonate, p-benzylbiphenyl, phenyl-α-naphthylcarbonate, 1,4-diethoxynaphthalene, phenyl-1-hydroxy-2-naphthoate, 1,2-di-(3-methylphenoxy)ethane, di(methylbenzyl)oxalate, β-benzyloxynaphthalene, 4-biphenyl-p-tolylether, or the like.

It is also an option to employ stabilizers for thermal recording sheets. Such stabilizers are typically based on metal salts (Ca, Zn) of p-nitrobenzoic acid or metal salts (Ca, Zn) of monobenzylphthalate used in amounts not to impair the activity of the dyes within the formulation.

The types and amounts of the dye, activator, sensitizer, stabilizer and other constituents used in the thermal dye system of the present invention are not specifically limited. These variables are determined according to the required properties and their ability of the component to meet these requirements. It is typical to employ 1 to 8 parts of the activator, 0 to 2.5 parts of the stabilizer, 0 to 12 parts of the sensitizer per part of the reactive dyes, based on the weight of total reactive dye. The thermal dye system typically comprises 5–40 wt. % of the coating formulation or thermal transfer layer, based on total solids.

The thermal dye system components are preferably added to the coating formulation in a conventional manner using conventional equipment such as an attritor operating at above ambient temperature. The invention is not limited to coating formulations prepared in this manner. It is contemplated that the preparation method can vary widely to include non-conventional methods for preparing the coating formulations.

The thermal dye system is preferably employed in the coating formulation in an amount of up to than 40 wt. % so as not to interfere with the function of the thermal transfer layer and preferably less than 20 wt. %, based on the total dry components of the coating formulation. Most preferably, the amount of reactive dye employed ranges from 0.5 wt. % to 10 wt. %, based on total dry components of the coating formulation. The proportion of activator, dye, optional sensitizer and stabilizer also vary within the thermal dye system and influence the preferred levels of the thermal dye system.

The coating formulations of this invention often contain both wax and polymer resin as binder components. Suitable waxes provide temperature sensitivity and flexibility. Such waxes can be natural waxes such as carnauba wax, candelilla wax, rice bran wax, bees wax, lanolin, motan wax and ceresine wax; petroleum waxes such as paraffin wax and microcrystalline waxes; synthetic hydrocarbon waxes such as low molecular weight polyethylene and Fisher-Tropsch wax; higher fatty acids such as lauric acid, myristic acid, palmitic acid, stearic acid and behenic acid; higher aliphatic alcohols such as stearyl alcohol and esters such as sucrose fatty acid esters, sorbitane fatty acid esters and amides. Mixtures of waxes can also be used. Particular examples of suitable waxes are carnauba wax under the Slip-Ayd series of surface conditioners by Daniel Products Co. and low molecular weight polyethylene.

The melting point of the wax is preferably less than 250° C. and typically falls within the range of from 40° C. to 250° C., and most preferably is from 60° C. to 150° C. Waxes with melting points at the high end are advantageous in that they aid in the integrity of the printed image.

The amount of wax used in the coating formulations of present invention is preferably above 5 wt. % based on the dry ingredients, most preferably 25 to 85 wt. % based on the dry ingredients. To aid in processing, rheology and compatibility with binder resin, micronized grades of wax are preferred.

The binder components of the coating formulation of this invention may comprise only a polymer resin; however, as indicated above, combinations of polymer resin and wax are often used. Suitable polymer resins are those conventionally used in coating formulations for thermal transfer ribbons. These include thermoplastic resins such as those described in U.S. Pat. No. 5,240,781 and U.S. Pat. No. 5,348,348, and reactive polymer resins such as the epoxy resins described in copending application Ser. No. 08/620,737, filed May 25, 1996, assigned to the same assignee as the present invention.

Particular examples of suitable thermoplastic resins include the following: polyvinylchloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polyvinylalcohol, polystyrene, styrene copolymers, polyacrylamide, polyamide, cellulose derivatives (ethylcellulose, acetyl cellulose, hydroxyethylcellulose, methylcellulose and carboxymethylcellulose), epoxy resin, polyketone resin, terpene resin, petroleum resin, polyurethane resin, polyvinyl butyryl, styrene-butadiene copolymer rubber, nitrile rubber, acrylic rubber, ethylene-propylene rubber, ethylene alkyl (meth)acrylate copolymer, silicone resins, styrene-alkyl (meth)acrylate copolymer, acrylic acid-ethylene-vinyl acetate terpolymer, styrene-maleic anhydride copolymer, saturated polyesters and sucrose benzoate. Suitable saturated polyesters are further described in U.S. Pat. No. 4,983,446. Suitable polyvinylalcohols further include fully saponified polyvinyl alcohol having a polymerization degree of 200 to 1,900, partially-saponified polyvinylalcohol, carboxy-modified polyvinylalcohol, amide-modified polyvinylalcohol, sulfonic acid-modified polyvinylalcohol, and other modified polyvinylalcohols. Preferred thermoplastic binder resins include sucrose benzoate, polyethylene, polyketone resins and styrene copolymers.

These polymeric substances can be dissolved in water, and solvents such as alcohols, ketones, esters, hydrocarbons and the like, or emulsified or dispersed in water or other media, or can be used in combination according to the quality requirements. To obtain emulsions of binder resins which are insoluble or poorly soluble in water, the binder resin is typically ground to submicron size.

Suitable reactive binder components include epoxy resins and a polymerization initiator (crosslinker). Suitable epoxy resins include those that have at least two oxirane groups such as epoxy novalak resins obtained by reacting epichlorohydrin with phenol/formaldehyde condensates or cresol/formaldehyde condensates. Another preferred epoxy resin is polyglycidyl ether polymers obtained by reaction of epichlorohydrin with a polyhydroxy monomer such as 1,4 butanediol. A specific example of suitable epoxy novalak resin is Epon 164 available from Shell Chemical Company. A specific example of the polyglycidyl ether is available from Ciba-Geigy Corporation under the trade name Araldite® GT 7013. The epoxy resins are preferably employed with a crosslinker which activates upon exposure to the heat from a thermal print head. Preferred crosslinkers include polyamines with at least two primary or secondary amine groups. Examples being Epi-cure P101 and Ancamine 2014FG available from Shell Chemical Company and Air Products, respectively. Accelerators such as triglycidylisocyanurate can be used with the crosslinker to accelerate the reaction. When used, the epoxy resins typically comprise more than 25 wt. % of the coating formulation based on dry components in view of their low viscosity. Waxes are typically not necessary when reactive epoxy resins form the binder.

Preferred coating formulations may contain two or more polymer resins to provide specific property profiles. For example, Piccotex resins by Hercules are hydrocarbon resins (vinyl toluene-alpha methyl styrene copolymers) that provide high hot tack properties which aid adhesion of the coating to the synthetic resin receiving substrate upon transfer. Polyethylene SL 300, a polyethylene resin emulsion of a small (submicron) particle size, is a surface conditioner within the Slip-Ayd series by Daniel Products which provides slip or wax-like properties for transfer. These polymer resins can be used together or with other polymer to provide a specific property profile.

The polymer resin has a melting/softening point of less than 300° C. and preferably in the range of 40° C. to 250° C. To provide high scratch and smear resistant images on synthetic resin substrates, the polymer resin may comprise at least 25 wt. %, based on total dry ingredients, of the coating formulation. In preferred embodiments, the polymer resin comprises 2 wt. % to 75 wt. % of the total dry ingredients.

Where a combination of wax and polymer resin is used, the polymer resin is preferably compatible with wax such that it does not separate out in aqueous dispersions or emulsions which contain 2 to 25 wt % wax, based on the total weight of said dispersion or emulsion. Such compatibility permits a high loading of polymer resin with the use of wax for producing images which transfer easily and provide high scratch and smear resistance. To enhance compatibility, i.e., minimize separation, it is preferable for the polymer resin and wax particles to be submicron size particles.

In addition to the reactive dyes, the coating formulation of the present invention may contain another sensible material which can be sensed by optical, visual, magnetic means, electroconductive means or by photoelectric means to modify the color or provide a special function. The most common sensible materials are coloring agents such as colored pigments or dyes and magnetic pigments (e.g., iron oxide). Carbon black is the most common colored pigment. Suitable examples of carbon black include "Raven 1255" provided by Colombian Chemical Company of Atlanta, Ga. Preferred carbon blacks provide thermal transfer media which develop little or no static during use within the thermal transfer medium. The less common coloring agents include those described in U.S. Pat. No. 3,663,278, phthalocyanine dyes, fluorescent naphthalimide dyes, cadmium, primrose, chrome yellow, ultra marine blue, titanium dioxide, zinc oxide, iron oxide, cobalt oxide and nickel oxide. Sensible materials other than coloring agents and magnetic pigments include photochromic dyes, photochromic pigments and fluorescent pigments, which are used in specialized applications.

Photochromic compounds suitable for use in this invention are those classified as organic photochromic compounds. These include the spiro compounds of formula V disclosed by Takahashi et al. in U.S. Pat. No. 5,266,447; the spiroxazine compounds, spiropyran compounds and thiopyran compounds of the formulae in columns 5–6 of U.S. Pat. No. 5,266,447; and also spiro(indoline)naphthoxazine compounds and derivatives thereof, spiro benzoxazine compounds and derivatives thereof, benzopyran compounds and derivatives thereof, naphthopyran compounds and derivatives thereof, benzothioxanthone compounds and derivatives thereof, naphthacenequinone compounds and derivatives thereof and the like.

Additional sensible materials, if used, are typically employed in an amount of from 5 to 70 wt. %, based on total dry ingredients of the coating formulation. Preferred levels typically range from 5 to 40 wt. %.

Although unnecessary, the coating formulation may contain plasticizers such as those described in U.S. Pat. No. 3,663,278, to aid in processing of the thermal transfer layer. Suitable plasticizers are adipic acid esters, phthalic acid esters, ricinoleic acid esters, sebasic acid esters and succinic acid esters, chlorinated diphenyls, citrates, epoxides, glycerols, glycols, hydrocarbons, chlorinated hydrocarbons, phosphates and the like. Plasticizers typically provide low temperature sensitivity and flexibility to the thermal transfer layer so as not to flake off the substrate that supports the thermal transfer layer.

The coating formulation may contain other conventional additives for thermal transfer media including flexibilizers such as oil, weatherability improvers such a UV light absorbers, fillers, such as inorganic or organic fillers such as silica, calcium carbonate, kaolin, calcinated kaolin, diatomaceous earth, talc, titanium oxide, aluminum hydroxide or the like, surfactants and dispersants which aid dispersion of the sensible materials and rheologic modifiers.

In addition to the above, it is possible to use release agents such as fatty acid metal salts, slip agents, benzophenone- or triazole-based ultraviolet absorbers, water resistant agents such as glyoxal, dispersants, defoamers and the like.

The coating formulations of this invention can contain the above identified solids in an aqueous or organic solution, dispersion or emulsion. The coating formulation is preferably water-based or water-rich. However, the solvents can vary widely and included in this invention are coating formulations wherein water is a minor portion of the total solvent or completely absent. The organic solvents used with water include alcohols such as propanol. Mineral spirits is a suitable organic solvent for some formulations. Other suitable solvents include selected esters, ketones, alcohols, aliphatics, aromatics and ethers.

The solids content of the coating formulation is typically within the range of 15 to 80 wt. % and more typically within the range of 20–55 wt. %.

Preferred coating formulations comprise 10 to 85 wt. % wax, 40 to 75 wt. % polymer resin and 5 to 40 wt. % reactive dye system based on the total weight of dry ingredients. Preferred formulations typically contain a mixture of Carnauba wax and an ethyl vinyl acetate copolymer.

The coating formulation of the present invention can be prepared in conventional equipment, such as an attritor, ball mill, or simple vessel with an impeller, by combining the ingredients, preferably as solvent dispersions, to this equipment and agitating the same. The solids are typically added as dispersions at about 20–30 wt. % solids. The wax is typically added first and the remaining components are added with minor heating. The preferred method is to mix the solvent, wax components and binder resin at an elevated temperature, preferably about 65° C., for about 15 minutes, after which the thermal dye system is added and the resulting mixture is ground in an attritor at the same temperature or lower for at least one hour, so as not to activate the reactive dye.

The thermal transfer medium of the present invention comprises a substrate, preferably a thin smooth paper or plastic-like material and a thermal transfer layer comprised of at least one of each of: a binder component and thermal dye system as described above. Suitable binder components comprise the polymer resins and waxes described above. Suitable substrate materials include tissue type paper materials such as 30–40 gauge capacitor tissue, manufactured by Glatz and polyester-type plastic materials such as 14–35 gauge polyester film manufactured by Dupont under the trademark Mylar®. Polyethylene terephthalate films, polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness to prolong the life of heating elements within thermal print heads. The thickness is preferably 3 to 10 microns. If desired, the substrate or base film may be provided with a backcoating on the surface opposite the thermal transfer layer.

The thermal transfer layer is typically obtained from a coating formulation of the present invention in the form of either a solution, dispersion or emulsion. The thermal transfer layer may contain all the additives and components suitable for the coating formulations described above. Once applied to the substrate, a portion of the solvent can remain in the coating. The residual solvent is typically undesirable but it may aid in transferring the image.

The thermal transfer layer (functional layer) preferably has a softening point within the range of about 50° C. to 250° C. which enables transfer at normal print head energies which range from about 100° C. to 250° C. and more typically from about 100° C. to 150° C.

The thermal transfer layers can be prepared by conventional techniques and equipment such as a Meyer Rod or like wire round doctor bar set up on a conventional coating machine to provide the coating weights described below. The coating weight of the thermal transfer layer typically ranges from 1.9 to 8.0 g/m$^2$. A temperature of about 65° C. or lower is typically maintained during the entire coating process. After the coating formulation is applied, it is optionally passed through a dryer at a moderate temperature to ensure drying and adherence of the functional layer to the substrate without activating the reactive dyes. The thermal transfer layer can be fully transferred onto a receiving substrate such as paper or synthetic resin by conventional thermal transfer printers, preferably at a temperature in the range of 75° C. to 200° C. Most preferably, the thermal transfer layer is transferred at two or more distinct temperatures to generate different colors from each reactive dye.

The thermal transfer media of the present invention can provide the advantages of thermal printing while providing the additional feature of multicolor images. In preferred embodiments, the colors cyan, magenta, yellow and black can be generated from one thermal transfer medium.

There is provided by this invention thermal transfer printers used in combination with thermal transfer media of this invention. All printer hardware and software for the equipment is conventional and known to those skilled in the art, except for the thermal transfer medium, which contains a thermal transfer layer with a thermal dye system. Preferred embodiments are multihead thermal printers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above and below, are hereby incorporated by reference.

EXPERIMENTAL

Coating Formulations

Coating formulations are prepared by mixing water, wax and binder resin in the proportions indicated in Table 1 within an attritor at ambient temperature, for about 15 minutes. A thermal dye system with one or more dyes identified below is added to the resultant mixture and mixed for about 10–15 minutes. The mixture is cooled before addition if necessary.

TABLE 1

| Material | Wt. % Dry | Wt. % Dry - Range | Grams Dry | Grams Wet |
|---|---|---|---|---|
| Candelilla wax emulsion[1] | 50 | 40–85% | 60 | 300 |
| PolyO$_x$ N-10 Resin[2] | 20 | 2–30% | 24 | 24 |
| Copikem[3] Dye Blend | 10.0 | 1–30% | 12 | 12 |
| Para-bisphenol A | 20.0 | 15–40% | 24 | 24 |
| Water | — | — | — | 480 |
| Total | 100.0 | | 120.0 | 840 |

[1]Available from Strahl & Pitsch Inc. of West Babylon, N.Y.
[2]Available from Union Carbide.
[3]Available from Hilton Davis Co., Cincinnati, Ohio.

The following dyes are available from Hilton Davis Co., with their corresponding colors and temperature of activation with Bisphenol A:

Copikem 20 - magenta 125° C.
Copikem 1 - blue 109° C.
Copikem 35 - red 135° C.
Copikem 4 - black 122° C.
Copikem 34 - black 130° C.
Copikem 37 - yellow 98° C.

THERMAL TRANSFER MEDIA

Thermal transfer media are prepared by coating a formulation as defined above onto a 4.5 μm Polyester Mylar Film by E.I. Dupont de Nemours & Co., Incorporated at a coat weight of from about 1.9 to about 8 g/m². The solution is coated onto the Mylar film at ambient temperature using a doctor bar and subsequently dried.

Samples of thermal transfer media with a blend of Copikem 20 (magenta), Copikem 1 (blue) and Copikem 37 (yellow) are used in printing bar codes in a Zebra 140 printer at various print head settings. The medium shows distinct print clarity, darkness and tone with heat settings of from 14–24. With the proper selection of blend components, the amounts thereof and adjustment of print head temperatures, distinct colors can be produced from the same ribbon.

The preceding examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An epoxy resin obtained by using a cresol novolak resin of which the total content of 3 to 6 nucleus bodies is 67 to 90% by weight, said epoxy resin being represented by the following formula (I):

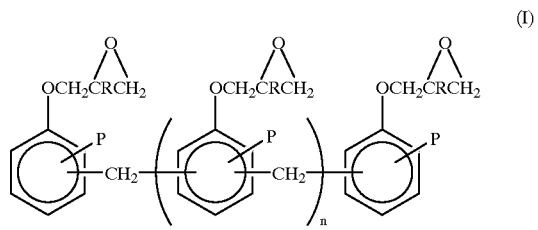

(in the formula (I), each P represents a methyl group, R represents a hydrogen atom or an alkyl group having 1 to 5 carbon atoms, and n is a positive number of 0.1 to 20 on average), wherein the plot of melt viscosity of said epoxy resin measured at 150° C. by a cone plate method (variable, y: unit, poise) vs. the ratio of the total weight of 3 to 6 nucleus bodies in said epoxy resin (variable, x; unit, % by weight) satisfies the following conditions:

said plot is present within the area surrounded by the lines of:

1) $y=500e^{-0.120x}$, 2) $y=1000e^{-0.120x}$, 3) $y=400$ and 4) $y=0.1$, and the ratio of c/d is 1.8 or less, c (% by weight) being the amount of an epoxy resin component contained in a fraction which constitutes the highest peak obtained by gel permeation chromatography (GPC) to the total epoxy resin and d being the amount of an epoxy resin component contained in a fraction which constitutes the second highest peak to the total epoxy resin.

2. A coating formulation as in claim 1 which contains a wax and polymer resin as binder components and the solvent is water.

3. A coating formulation as in claim 2, wherein the two or more reactive dyes are leuco dyes selected from the group consisting of:

Leuco bases of triphenylmethane dyes, selected from the group consisting of:
3,3-bis(p-dimethylaminophenyl)-phthalide,
3,3-bis(p-dimethylaminophenyl)-6-dimethylaminophthalide (or Crystal Violet Lacton),
3,3-bis(p-dimethylaminophenyl)-6-diethylaminophthalide,
3,3-bis(p-dimethylaminophenyl)-6-chlorophthalide and
3,3-bis(p-dibutylaminophenyl)-phthalide;

Leuco base of fluoran dyes, selected from the group consisting of:
3-cyclohexylamino-6-chlorofluoran,
3-(N,N-diethylamino)-5-methyl-7-(N,N-dibenzylamino)fluoran,
3-dimethylamino-5,7-dimethylfluoran,
3-diethylamino-7-methylfluoran and
3-diethylamino-5-methyl-7-t-butylfluoran;

Fluoran dyes, selected from the group consisting of:
3-diethylamino-7-chlorofluoran,
3-diethylamino-6-methyl-7-chlorofluoran,
3-pyrrolidino-6-methyl-7-chlorofluoran,
3-dimethylamino-6-methyl-7-anilinofluoran,
2-(N-(3'-trifluoromethylphenyl)amino)-6-diethylaminofluoran, 3-diethylamino-7-cyclohexylaminofluoran,
2-(3,6-bis(diethylamino)-9-(o-chloroanilino)xyanthyl-benzoic acid lactam),
3-dimethylamino-6-methyl-7-p-butylanilinofluoran,
3-diethylamino-6-methyl-7-anilinofluoran,
3-(N-ethyl-p-toluidino)-6-methyl-7-anilinofluoran,
3-(N-ethyl-N-isoamylamino)-6-methyl-7-anilinofluoran,
3-diethylamino-6-methyl-7-(o,p-dimethylanilino)fluoran,
3-pyrrolidino-6-methyl-7-anilinofluoran,
3-piperidino-6-methyl-7-anilinofluoran,
3-(N-cyclohexyl-N-methylamino)-6-methyl-7-anilinofluoran,
3-diethylamino-7-(m-trifluoromethylanilino)fluoran,
3-dibutylamino-6-methyl-7-anilinofluoran,
3-diethylamino-6-methyl-7-anilinofluoran,
3-dibutylamino-7-(o-chloroanilino)fluoran and
3-diethylamino-7-(o-chloroanilino)fluoran; and Lacton compounds, selected from the group consisting of:
3-(2'-hydroxy-4-dimethylaminophenyl)-3-(2'-methoxy-5'-chlorophenyl)phthalide,
3-(2'-hydroxy-4-dimethylaminophenyl)-3-(2'-methoxy-5'-nitrophenyl)phthalide,
3-(2'-hydroxy-4-diethylaminophenyl)-3-(2'-methoxy-5'-methylphenyl)phthalide, and
3-(2'-hydroxy-4-dimethylaminophenyl)-3-(2'-hydroxy-4'-chloro-5'-methylphenyl)phthalide.

4. A coating formulation as in claim 1 which contains leuco dyes that will form the at least two colors selected from the group consisting of black, magenta, yellow and cyan.

5. A coating formulation as in claim 1 which contains a sensitizer and modifier.

6. A coating formulation as in claim 2 which comprises as activators selected from the group consisting of:

boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, 3,5-xylenol, thymol, p-tert-butylphenyl, 4-hydroxyphenoxide, methyl-4-hydroxybenzoate, 4-hydroxyacetophenone, α-naphthol, β-naphthol, catechol, resorcin, hydroquinone, 4-tert-octylcatechol, 4,4'-butylidenephenol, 2,2'-dihydroxydiphenyl, 2,2'-methylenebis(4-methyl-6-tert-butyl-phenol), 2,2'-bis(4'-hydroxyphenyl)propane or bisphenol A), 4,4'-isopropylidenebis(2-tert-butylphenol), 4,4'-secbutylidenediphenol, pyrogallol, phloroglucine, phlorogluocinocarboxylic acid, 4-phenylphenol, 2,2'-methylenebis(4-chlorophenyl), 4,4'-isopropylidenediphenol, 4,4'-isopropylidenebis(2-chlorophenol), 4,4'-isopropylidenebis(2-methylphenol), 4,4'-ethylenebis(2-methylphenol) and 4,4'-thiobis(6-t-butyl-3-methylphenol). Certain examples can be classified into groups which include, bisphenol A and its derivatives, 4-hydroxybenzoic esters, 4-hydroxyphthalic diesters, phthalic monomers, bis(hydroxyphenyl)sulfides, 4-hydroxyarylsulfones, 4-hydroxyphenylarylsulfonates, 1,3-di[2-(hydroxyphenyl)-2-propyl]benzenes, resorcinols, hydroxybenzoyloxybenzoic ester, bisphenolsulfones, 2,4-dihydroxybenzophenones, novolac type phenolic resins, 4-hydroxyacetophenone and p-phenylphenol.

7. A coating formulation as in claim 2 which comprises 5 to 40 wt. % thermal dye system, 5 to 60 wt. % thermoplastic polymer resin and 20 to 85 wt. % wax, all based on dry components.

8. A coating formulation as in claim 1, wherein the thermal dye system comprises per part of reactive azo or leuco dyes, 1–8 parts activator, 0–2.5 parts stabilizer and 0–12 parts sensitizer, based on weight.

* * * * *

UNITED STATES PATENT AND TRADEMARK OFFICE
CERTIFICATE OF CORRECTION

PATENT NO. : 6,031,021
DATED : February 29, 2000
INVENTOR(S) : Frank J. Kenny et al.

It is certified that error appears in the above-identified patent and that said Letters Patent is hereby corrected as shown below:

Delete Claim 1 in its entirety as it appears in the Letters Patent, and insert Claim 1 as it appears below:

1. A coating formulation that generates different colors when exposed to different temperatures which comprises:
   a) a binder component selected from the group consisting of waxes, thermoplastic polymer resins and combinations thereof;
   b) a solvent; and
   c) a thermal dye system comprising two or more reactive azo or leuco dyes wherein each have a distinct temperature of activation and each generate a distinct color once reacted such that the thermal dye system can generate two or more colors when exposed to different temperatures, an activator for the reactive azo or leuco dyes and optionally a sensitizer for the reactive azo or leuco dyes;
   wherein the binder components are selected to provide coatings with a softening point suitable for use as thermal transfer layers for thermal transfer media that transfer printed images to a receiving substrate upon exposure to the print head of a thermal printer, wherein the difference in the temperature of activation of each azo or leuco dye is at least 11 C.

Signed and Sealed this

Second Day of October, 2001

Attest:

*Attesting Officer*

NICHOLAS P. GODICI
*Acting Director of the United States Patent and Trademark Office*